US010750381B2

United States Patent
Meylan et al.

(10) Patent No.: US 10,750,381 B2
(45) Date of Patent: Aug. 18, 2020

(54) LOW LATENCY OPERATION

(71) Applicant: QUALCOMM Incorporated, San Diego, CA (US)

(72) Inventors: Arnaud Meylan, San Diego, CA (US); Shyamal Ramachandran, San Diego, CA (US); Neha Goel, Herndon, VA (US)

(73) Assignee: Qualcomm Incorporated, San Diego, CA (US)

( * ) Notice: Subject to any disclaimer, the term of this patent is extended or adjusted under 35 U.S.C. 154(b) by 19 days.

(21) Appl. No.: 16/247,390

(22) Filed: Jan. 14, 2019

(65) Prior Publication Data

US 2019/0239097 A1  Aug. 1, 2019

Related U.S. Application Data

(60) Provisional application No. 62/622,564, filed on Jan. 26, 2018.

(51) Int. Cl.
| | |
|---|---|
| *H04W 24/02* | (2009.01) |
| *H04W 76/22* | (2018.01) |
| *H04W 76/28* | (2018.01) |
| *H04L 1/18* | (2006.01) |
| *H04W 72/14* | (2009.01) |

(52) U.S. Cl.
CPC ........... *H04W 24/02* (2013.01); *H04L 1/1812* (2013.01); *H04W 72/14* (2013.01); *H04W 76/22* (2018.02); *H04W 76/28* (2018.02)

(58) Field of Classification Search
CPC .... H04L 1/1812; H04W 24/02; H04W 72/14; H04W 76/20; H04W 76/22; H04W 76/28
See application file for complete search history.

(56) References Cited

PUBLICATIONS

Ericsson, "Further discussion on UE-supported DRX configuration", R2-121517, 3GPP TSG-RAN WG2 #77bis, Mar. 26-30, 2012 (Year: 2012).*
Samsung, "Changes to delay budget reporting related to ASN.1 review", R2-1705496, 3GPP TSG-RAN2 Meeting #98, May 15-19, 2017 (Year: 2017).*
Ericsson, et al., "Further Discussion on UE-Supported DRX Configuration", 3GPP TSG-RAN WG2# 77bis, R2-121517 Further Discussion on UE Selected DRX Configuration, 3rd Generation Partnership Project (3GPP), Mobile Competence Centre, 650, Route Des Lucioles, F-06921 Sophia-Antipolis Cedex, France, vol. RAN WG2, No. Jeju, South Korea; Mar. 26, 2012-Mar. 30, 2012, Mar. 19, 2012 (Mar. 19, 2012), pp. 1-5, XP050606081, [retrieved on Mar. 19, 2012] the whole document.
International Search Report and Written Opinion—PCT/US2019/013667—ISA/EPO—dated Apr. 15, 2019.

* cited by examiner

*Primary Examiner* — Khoa Huynh
(74) *Attorney, Agent, or Firm* — Harrity & Harrity, LLP

(57) ABSTRACT

Various aspects of the present disclosure generally relate to wireless communication. In some aspects, a user equipment (UE) may set a value associated with a delay budget report information element based at least in part on determining that the UE is to employ low latency communication with or via a base station. The UE may transmit a message, that includes the value associated with the delay budget report information element, to the base station to indicate that low latency communication is to be employed in association with a default bearer established between the UE and the base station. Numerous other aspects are provided.

30 Claims, 12 Drawing Sheets

LOW LATENCY OPERATION

CROSS-REFERENCE TO RELATED APPLICATIONS UNDER 35 U.S.C. § 119

This application claims priority to U.S. Provisional Patent Application No. 62/622,564, filed on Jan. 26, 2018, entitled "TECHNIQUES AND APPARATUSES FOR LOW LATENCY OPERATION," which is hereby expressly incorporated by reference herein.

FIELD OF THE DISCLOSURE

Aspects of the present disclosure generally relate to wireless communication, and more particularly to techniques and apparatuses for low latency operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include setting a value associated with a delay budget report information element based at least in part on determining that the UE is to employ low latency communication with or via a base station; and transmitting a message, that includes the value associated with the delay budget report information element, to the base station to indicate a latency requirement for a default bearer.

In some aspects, a UE for wireless communication may include memory and one or more processors operatively coupled to the memory. The memory and the one or more processors may be configured to set a value associated with a delay budget report information element based at least in part on determining that the UE is to employ low latency communication with or via a base station; and transmit a message, that includes the value associated with the delay budget report information element, to the base station to indicate a latency requirement for a default bearer.

In some aspects, a non-transitory computer-readable medium may store one or more instructions for wireless communication. The one or more instructions, when executed by one or more processors of a UE, may cause the one or more processors to set a value associated with a delay budget report information element based at least in part on determining that the UE is to employ low latency communication with or via a base station; and transmit a message, that includes the value associated with the delay budget report information element, to the base station to indicate a latency requirement for a default bearer.

In some aspects, an apparatus for wireless communication may include means for setting a value associated with a delay budget report information element based at least in part on determining that the apparatus is to employ low latency communication with or via a base station; and means for transmitting a message, that includes the value associated with the delay budget report information element, to the base station to indicate a latency requirement for a default bearer.

In some aspects, a method of wireless communication, performed by a base station, may include receiving, from a user equipment (UE), a message when a dedicated bearer is not active for the UE, wherein the message includes a value associated with a delay budget report information element; and performing an action to reduce latency of UE communications based at least in part on receiving the message when the dedicated bearer is not active for the UE.

In some aspects, a base station for wireless communication may include memory and one or more processors operatively coupled to the memory. The memory and the one or more processors may be configured to receive, from a user equipment (UE), a message when a dedicated bearer is not active for the UE, wherein the message includes a value associated with a delay budget report information element; and perform an action to reduce latency of UE communications based at least in part on receiving the message when the dedicated bearer is not active for the UE.

In some aspects, a non-transitory computer-readable medium may store one or more instructions for wireless communication. The one or more instructions, when executed by one or more processors of a base station, may cause the one or more processors to receive, from a user equipment (UE), a message when a dedicated bearer is not active for the UE, wherein the message includes a value associated with a delay budget report information element; and perform an action to reduce latency of UE communications based at least in part on receiving the message when the dedicated bearer is not active for the UE.

In some aspects, an apparatus for wireless communication may include means for receiving, from a user equipment (UE), a message when a dedicated bearer is not active for the UE, wherein the message includes a value associated with a delay budget report information element; and means for performing an action to reduce latency of UE communications based at least in part on receiving the message when the dedicated bearer is not active for the UE.

In some aspects, a method of wireless communication, performed by a wireless communication device, may include communicating a message that includes a value associated with a delay budget report information element, wherein the message is communicated when a dedicated bearer is not active for a user equipment (UE) that transmits the message; and causing low latency communication to be configured for the UE based at least in part on communicating the message when a dedicated bearer is not active for the UE.

In some aspects, a wireless communication device for wireless communication may include memory and one or more processors operatively coupled to the memory. The memory and the one or more processors may be configured to communicate a message that includes a value associated with a delay budget report information element, wherein the message is communicated when a dedicated bearer is not active for a user equipment (UE) that transmits the message; and cause low latency communication to be configured for the UE based at least in part on communicating the message when a dedicated bearer is not active for the UE.

In some aspects, a non-transitory computer-readable medium may store one or more instructions for wireless communication. The one or more instructions, when executed by one or more processors of a wireless communication device, may cause the one or more processors to communicate a message that includes a value associated with a delay budget report information element, wherein the message is communicated when a dedicated bearer is not active for a user equipment (UE) that transmits the message; and cause low latency communication to be configured for the UE based at least in part on communicating the message when a dedicated bearer is not active for the UE.

In some aspects, an apparatus for wireless communication may include means for communicating a message that includes a value associated with a delay budget report information element, wherein the message is communicated when a dedicated bearer is not active for a user equipment (UE) that transmits the message; and means for causing low latency communication to be configured for the UE based at least in part on communicating the message when a dedicated bearer is not active for the UE.

In some aspects, a method of wireless communication, performed by a UE, may include setting a value associated with a delay budget report information element based at least in part on determining that the UE is to employ low latency communication with or via a base station; and transmitting a message, that includes the value associated with the delay budget report information element, to the base station to indicate that low latency communication is to be employed in association with a default bearer established between the UE and the base station.

In some aspects, a UE for wireless communication may include memory and one or more processors operatively coupled to the memory. The memory and the one or more processors may be configured to set a value associated with a delay budget report information element based at least in part on determining that the UE is to employ low latency communication with or via a base station; and transmit a message, that includes the value associated with the delay budget report information element, to the base station to indicate that low latency communication is to be employed in association with a default bearer established between the UE and the base station.

In some aspects, a non-transitory computer-readable medium may store one or more instructions for wireless communication. The one or more instructions, when executed by one or more processors of a UE, may cause the one or more processors to set a value associated with a delay budget report information element based at least in part on determining that the UE is to employ low latency communication with or via a base station; and transmit a message, that includes the value associated with the delay budget report information element, to the base station to indicate that low latency communication is to be employed in association with a default bearer established between the UE and the base station.

In some aspects, an apparatus for wireless communication may include means for setting a value associated with a delay budget report information element based at least in part on determining that the UE is to employ low latency communication with or via a base station; and means for transmitting a message, that includes the value associated with the delay budget report information element, to the base station to indicate that low latency communication is to be employed in association with a default bearer established between the UE and the base station.

In some aspects, a method of wireless communication, performed by a base station, may include receiving, from a UE, a message that includes a value associated with a delay budget report information element, wherein the message indicates that low latency communication is to be employed in association with a default bearer established between the base station and the UE; and performing an action to reduce latency of UE communications based at least in part on receiving the message.

In some aspects, a base station for wireless communication may include memory and one or more processors operatively coupled to the memory. The memory and the one or more processors may be configured to receive, from a UE, a message that includes a value associated with a delay budget report information element, wherein the message indicates that low latency communication is to be employed in association with a default bearer established between the base station and the UE; and perform an action to reduce latency of UE communications based at least in part on receiving the message.

In some aspects, a non-transitory computer-readable medium may store one or more instructions for wireless communication. The one or more instructions, when executed by one or more processors of a base station, may cause the one or more processors to receive, from a UE, a message that includes a value associated with a delay budget report information element, wherein the message indicates that low latency communication is to be employed in association with a default bearer established between the base station and the UE; and perform an action to reduce latency of UE communications based at least in part on receiving the message.

In some aspects, an apparatus for wireless communication may include means for receiving, from a UE, a message that includes a value associated with a delay budget report information element, wherein the message indicates that low latency communication is to be employed in association with a default bearer established between the base station and the UE; and means for performing an action to reduce latency of UE communications based at least in part on receiving the message.

Aspects generally include a method, device, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
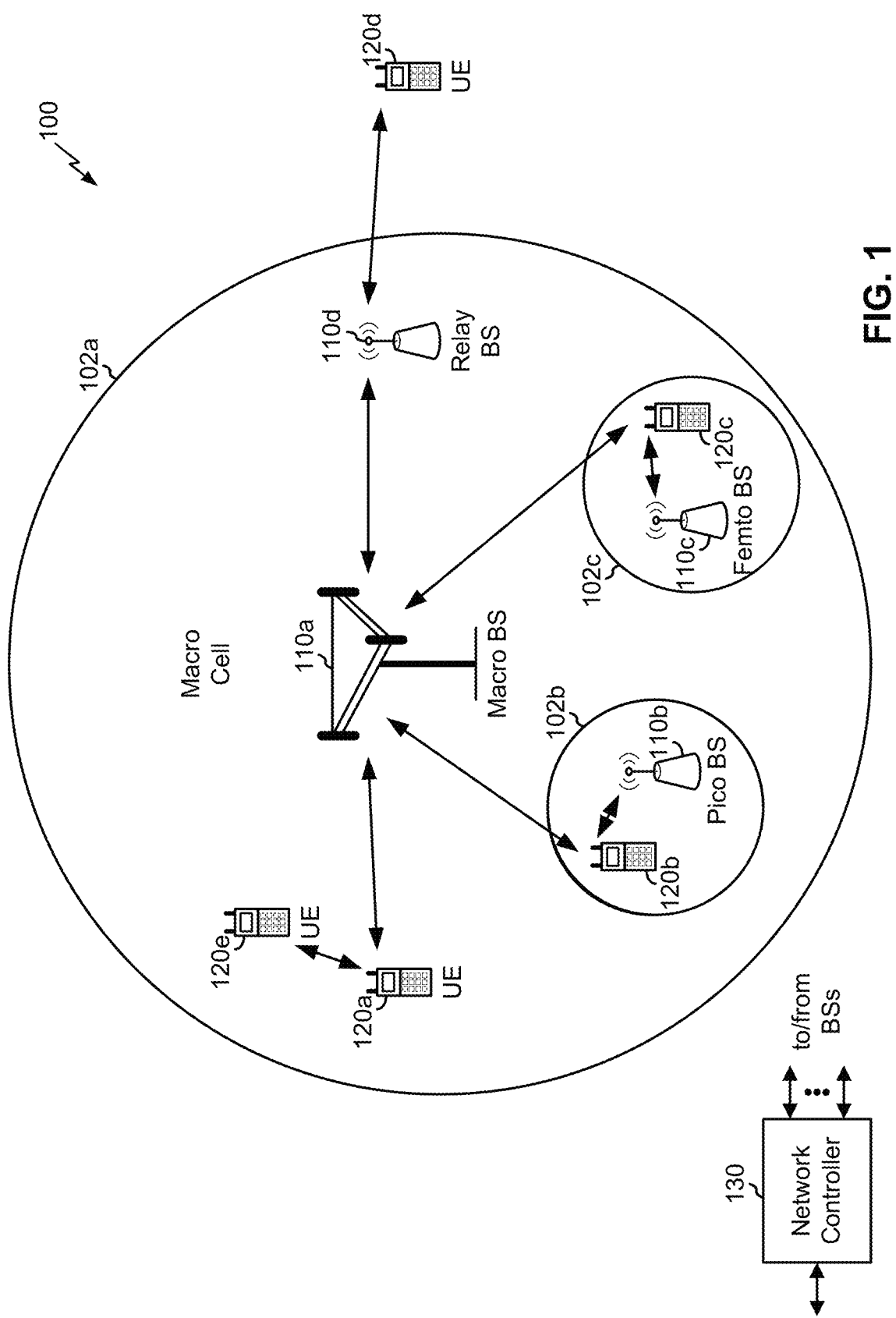
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
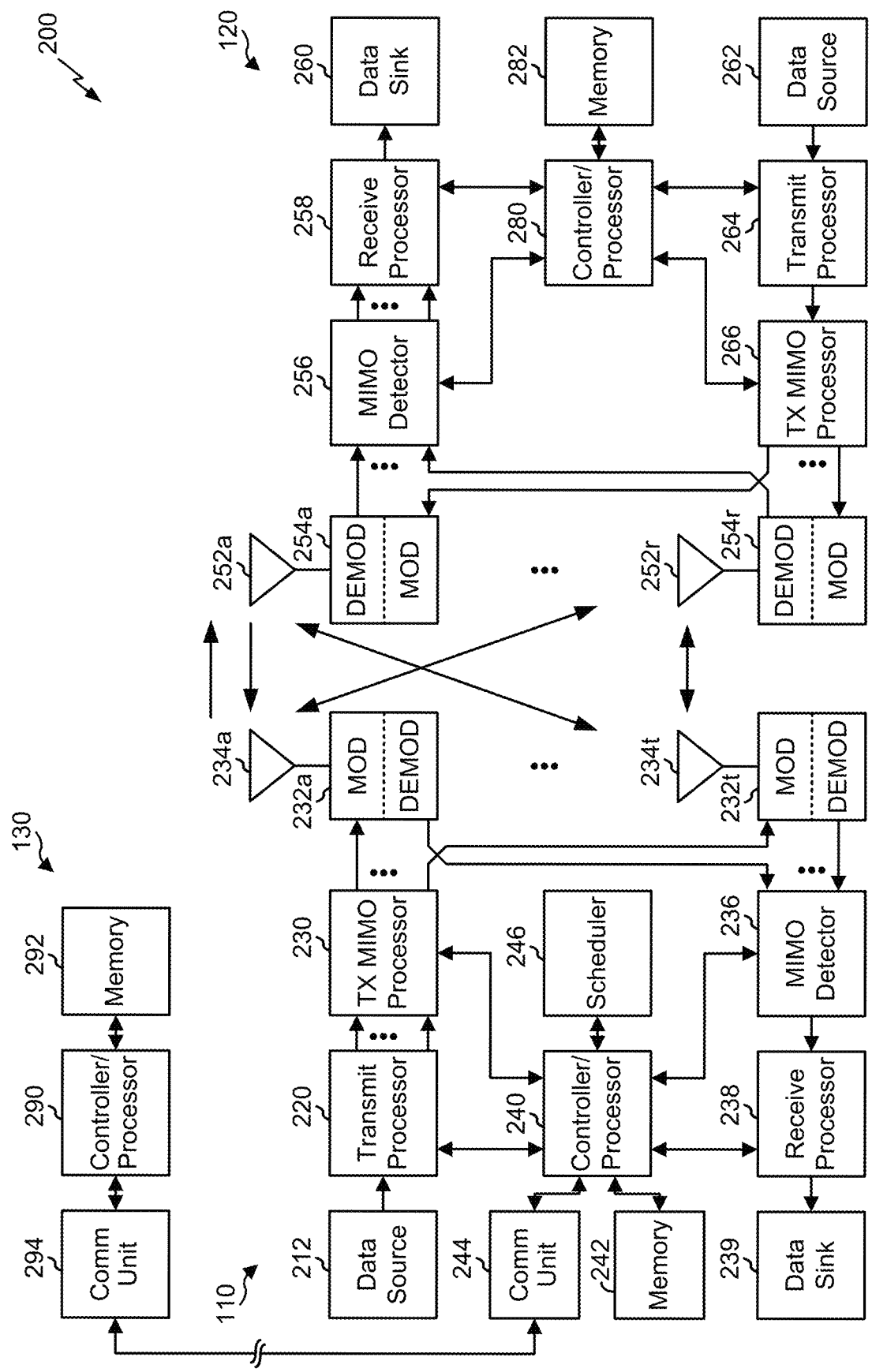
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with low latency operation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for setting a value associated with a delay budget report information element based at least in part on determining that the UE 120 is to employ low latency communication with or via a base station 110; means for transmitting a message, that includes the value associated with the delay budget report information element, to the base station 110 when a dedicated bearer is not active for the UE 120; and/or the like. Additionally, or alternatively, UE 120 may include means for setting a value associated with a delay budget report information element based at least in part on determining that the UE 120 is to employ low latency communication with or via a base station 110; means for transmitting a message, that includes the value associated with the delay budget report information element, to the base station to indicate that low latency communication is to be employed in association with a default bearer established between the UE 120 and the base station 110; and/or the like. In some aspects, such means may include one or more components of UE 120 described in connection with FIG. 2.

In some aspects, base station 110 may include means for receiving, from a UE 120, a message when a dedicated bearer is not active for the UE 120, wherein the message includes a value associated with a delay budget report information element; means for performing an action to reduce latency of UE communications based at least in part on receiving the message when the dedicated bearer is not active for the UE 120; and/or the like. Additionally, or alternatively, base station 110 may include means for receiving, from a UE 120, a message that includes a value associated with a delay budget report information element, wherein the message indicates that low latency communication is to be employed in association with a default bearer established between the base station 110 and the UE 120; means for performing an action to reduce latency of UE communications based at least in part on receiving the message; and/or the like. In some aspects, such means may include one or more components of base station 110 described in connection with FIG. 2.

In some aspects, UE 120 and/or base station 110 may include means for communicating a message that includes a value of a delay budget report information element, wherein the message is communicated when a dedicated bearer is not active for a UE 120 that transmits the message; means for causing low latency communication to be configured for the UE 120 based at least in part on communicating the message when a dedicated bearer is not active for the UE 120; and/or the like. In some aspects, such means may include one or more components of UE 120 and/or base station 110 described in connection with FIG. 2.

As indicated above, FIG. 2 is provided merely as an example. Other examples may differ from what is described with regard to FIG. 2.

Figure 3A:
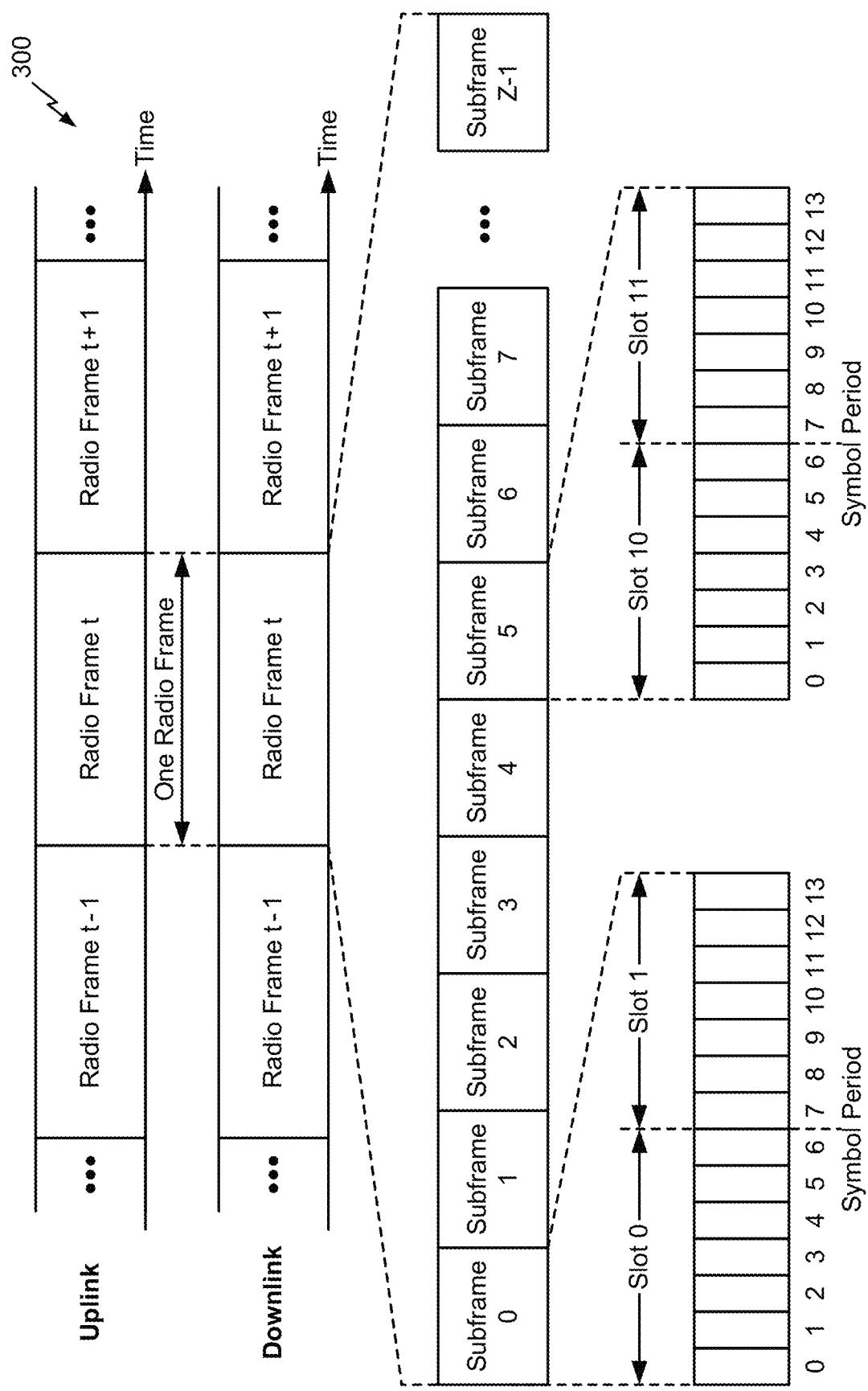
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
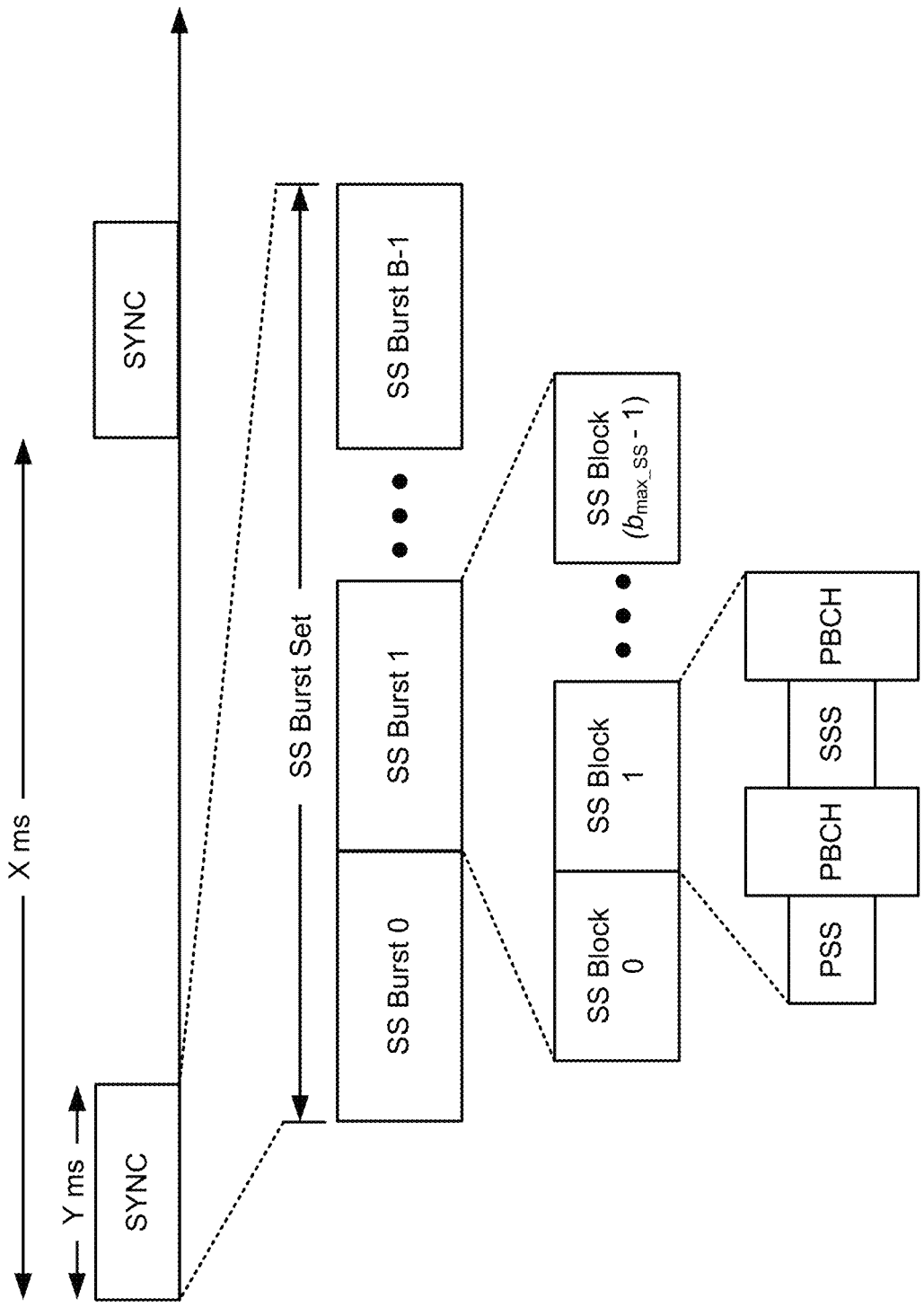
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
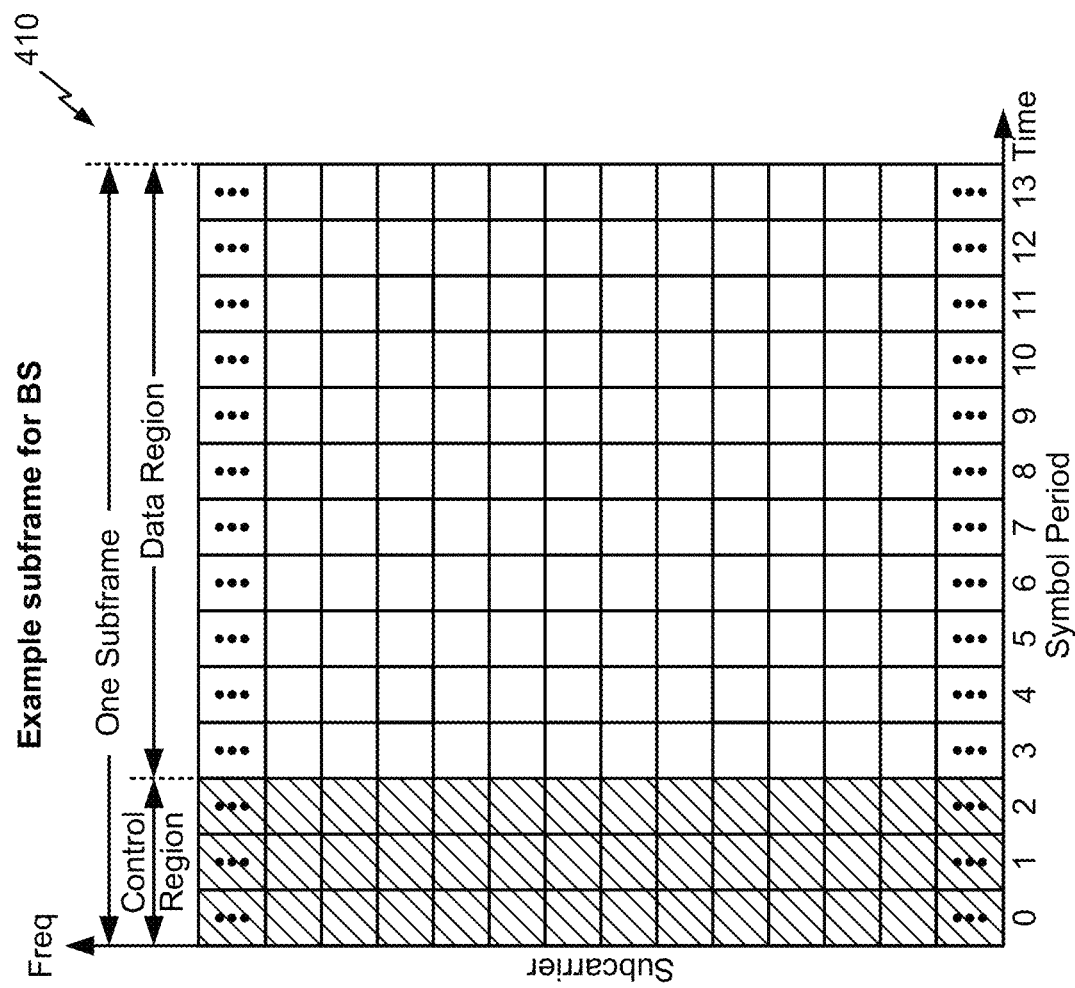
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
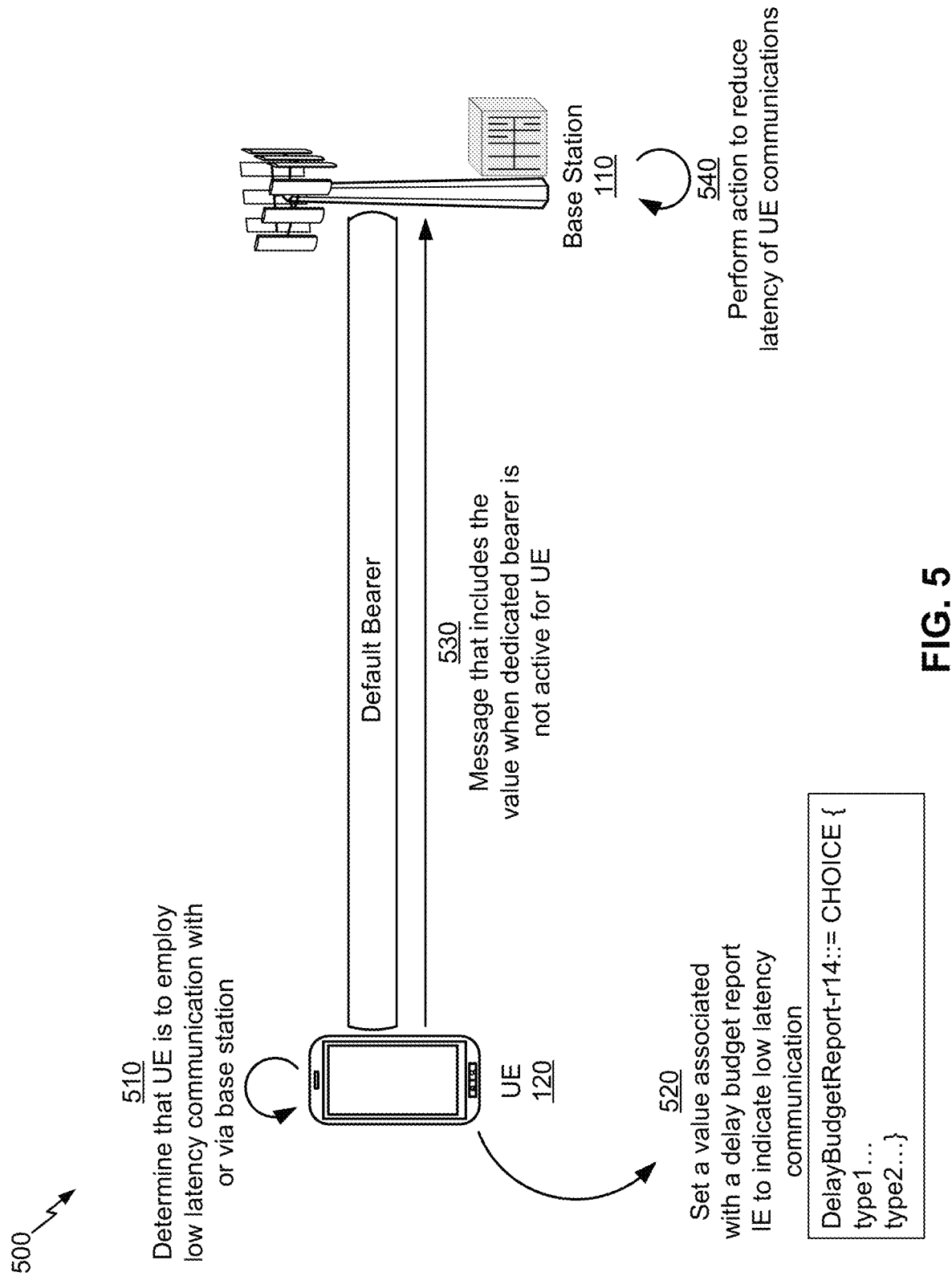
FIGS. 5 and 6 are diagrams illustrating examples of low latency operation, in accordance with various aspects of the present disclosure.

FIG. 5 is a diagram illustrating an example 500 of low latency operation, in accordance with various aspects of the present disclosure.

As shown in FIG. 5, a UE 120 may communicate with a base station 110. For example, the UE 120 and the base station 110 may communicate using a default bearer, which may be created in connection with an initial attachment procedure, establishment of a new packet data network (PDN) connection, and/or the like. In some aspects, the default bearer may be established upon initial attachment to a network (e.g., via base station 110), and may remain until the network connection is terminated, at which point the default bearer may be torn down. In some aspects, the default bearer may be associated with a best effort quality of service.

In some cases, when the UE 120 needs a higher quality of service than best effort (e.g., for low latency, high reliability, URLLC, and/or the like), such as for a Voice over Internet Protocol (VoIP) application (e.g., a Voice over LTE (VoLTE) service, video telephony and/or the like), a video application, a gaming application, and/or the like, a dedicated bearer may be established to carry traffic at the higher quality of service level. In some aspects, the default bearer and/or the dedicated bearer may be associated with Internet traffic. The dedicated bearer may be configured with different communication parameters than the default bearer to assist with providing a different quality of service level. In this case, traffic associated with a particular application may be communicated using the communication parameters of the dedicated bearer, and other traffic may be communicated using the communication parameters of the default bearer. In this way, a higher quality of service (e.g., a lower latency and/or the like) may be provided using the dedicated bearer.

However, establishing and maintaining a dedicated bearer requires memory resources (e.g., to store the dedicated bearer context) and processing resources (e.g., to filter network traffic and/or map the network traffic to the desired dedicated bearer), and may create additional load on a core network, a backhaul network, base station 110, and/or the like. Some techniques and apparatuses described herein permit a UE 120 to reliably signal, to a base station 110, a need for a higher quality of service level (e.g., low latency communications) on a default bearer, thereby conserving the memory resources and processing resources described above. These techniques and apparatuses may permit the UE 120 to obtain assistance from the base station 110 to satisfy a quality of service level, instead of or in addition to the UE 120 taking independent action at the UE 120 to attempt to satisfy the quality of service level, thereby increasing the likelihood that the quality of service level is satisfied.

As shown by reference number 510, the UE 120 may determine that the UE 120 is to employ low latency communication with or via the base station 110. For example, the UE 120 may be executing an application that requests low latency communication, an application that would benefit from low latency communication, an application that can utilize low latency communication, and/or the like. The UE 120 may detect that the UE 120 is executing such an application and/or may receive a request for low latency communication from such an application, and may determine that the UE 120 is to employ low latency communication based at least in part on the detection.

In some aspects, the low latency communication may be employed with the base station 110. In this case, both the UE 120 and the base station 110 may take action to employ low latency communication. For example, the UE 120 may configure one or more parameters of a modem of the UE 120 and/or another UE component to reduce latency (e.g., at the expense of battery power, spectral efficiency, overhead, and/or the like), such as by increasing a speed of packet processing, shortening a discontinuous reception (DRX) cycle, modifying one or more timers (e.g., reducing a duration of the one or more timers), and/or the like.

In some aspects, the low latency communication may be employed via the base station 110. For example, the base station 110 may take action to employ low latency communication with or without the UE 120 taking action to employ low latency communication. Example actions that may be performed by the base station 110 are described in more detail below.

As shown by reference number 520, the UE 120 may set a value associated with a delay budget report information element (IE) based at least in part on determining that the UE 120 is to employ low latency communication with or via the base station 110. In some aspects, the value may indicate and/or may notify the base station 110 that the UE 120 is to employ low latency communication with or via the base station 110.

As shown, in some aspects, a value may be included in a type1 field of the delay budget report information element. Additionally, or alternatively, a value may be included in a type2 field of the delay budget report information element. In some aspects, values in one or more fields may indicate different low latency communication requirements desired by the UE 120 with or via the base station 110, such as an uplink low latency communication configuration, a downlink low latency communication configuration, both an uplink and a downlink low latency communication configuration, a latency level for low latency communication (e.g., on the uplink, downlink, or both), and/or the like. Additionally, or alternatively, different values (e.g., in the same field or different fields) may indicate different low latency communication configurations. Additional details are described below in connection with FIG. 6.

When a dedicated bearer is active for the UE 120, the delay budget report IE may be used to notify the base station 110 of an air interface delay budget adjustment for the dedicated bearer. In this case, the UE 120 may use the delay budget report IE to report that the delay budget is to be decreased or increased. For example, for a VoLTE call, the UE 120 may be capable of determining the end-to-end latency associated with the VoLTE call, and the base station 110 may not be capable of making such a determination. In this case, the UE 120 may signal an adjustment to the delay budget, and the base station 110 may modify one or more parameters of a UE configuration (e.g., a DRX cycle length and/or a coverage enhancement transmission repetition configuration) based at least in part on receiving the signal indicating the adjustment. Some techniques and apparatuses described herein repurpose the delay budget report IE to indicate and/or request low latency communication, as described below.

As shown by reference number 530, the UE 120 may transmit, and the base station 110 may receive, a message that includes the value associated with the delay budget report information element. As shown, the message may be transmitted and/or received when a dedicated bearer is not active for the UE 120. When the value for the delay budget report IE is transmitted and/or received when a dedicated bearer (e.g., a VoLTE bearer and/or the like) is not active for the UE 120, then the value may indicate that the UE 120 is to employ low latency communication with or via the base station 110 (e.g., to request that the base station 110 take an action to employ low latency communication with the UE 120). Thus, the same IE and/or the same field of the IE may be used for different indications depending on whether a dedicated bearer is active for the UE 120 when a message that includes the IE and/or the field is transmitted or received, thereby reducing overhead associated with introducing an additional IE and/or field. In some aspects, the UE 120 and/or the base station 110 may determine that a dedicated bearer is active for the UE 120 when a media access control (MAC) layer of the UE 120 is configured with more than one data radio bearer or evolved packet system (EPS) bearer, and/or when at least one bearer is configured with a non-default quality of service (QoS) class identifier (QCI) value.

As shown by reference number 540, the base station 110 may perform an action to reduce latency of UE communications based at least in part on receiving the message when the dedicated bearer is not active for the UE 120. In some aspects, the action may include modifying one or more parameters of or associated with a default bearer of the UE 120 (e.g., to employ low latency communication on the default bearer). In some aspects, the base station 110 may indicate the action to the UE 120 to notify the UE 120 of the action taken by the base station 110. Additionally, or alternatively, the action may include instructing the UE 120 to perform an action to employ low latency communication. In some aspects, the UE 120 may perform an action to employ low latency communication regardless of whether such instruction is received from the base station 110. In some aspects, the action may be performed to employ low latency communication in association with a default bearer (e.g., to reduce latency of one or more communications carried via the default bearer).

In some aspects, the action may include modifying a set point for early hybrid automatic repeat request (HARQ) termination for the UE 120. For example, the base station 110 may target a block error rate of less than a threshold value (e.g., 5%, 10%, 15%, and/or the like) for a communication with the UE 120 on the first HARQ transmission. In some aspects, the base station 110 may modify the set point for HARQ termination to a lower level, in order to rely less often on HARQ retransmissions, which consume time, by modifying a modulation and coding scheme (MCS), a transmission mode, a number of antennas, a rank, and/or the like, used for communications with the UE 120. In some aspects, the base station 110 may modify the set point for HARQ termination to employ low latency communications for uplink communications and/or downlink communications.

Additionally, or alternatively, the action may include modifying a configuration of a transmission time interval (TTI) used to communicate with the UE 120. For example, the base station 110 may modify a duration of the TTI. For example, the base station 110 may employ short TTIs (e.g., 2 symbols or 7 symbols) in LTE, may employ a reduced processing time between scheduling and transmission of communications (e.g., from N+4 to N+3), may use self-contained TTIs (e.g., slots, subframes, and/or the like), where the uplink grant and corresponding uplink transmission occur in the same TTI, and/or the like. Additionally, or alternatively, the base station 110 may enable shortened TTIs (sTTIs) in NR. In some aspects, the base station 110 may employ one or more of these techniques on a random access channel (RACH), a shared channel (e.g., a PDSCH, a physical uplink shared channel (PUSCH), and/or the like), and/or the like. In some aspects, the base station 110 may modify the configuration of the TTI to employ low latency communications for uplink communications and/or downlink communications. In some aspects, the base station 110 may operate various carriers, some that use sTTIs. In this case, the traffic requiring low latency may be mapped to one or more carriers that use sTTIs, while other traffic would use the baseline configuration (e.g., mapped to one or more carriers that do not use sTTIs).

Additionally, or alternatively, the action may include configuring a low latency operating mode for the UE 120. For example, the base station 110 may enable LTE ultra-low latency, may enable NR URLLC, and/or the like. In some aspects, the base station 110 may employ one or more of these techniques on a random access channel (RACH), a shared channel (e.g., a PDSCH, a physical uplink shared channel (PUSCH), and/or the like), and/or the like. In some aspects, the base station 110 may configure a low latency operating mode to employ low latency communications for uplink communications and/or downlink communications.

Additionally, or alternatively, the action may include configuring semi-persistent scheduling for the UE 120. This may permit the UE 120 to transmit uplink data according to the semi-persistent schedule, instead of requesting and/or receiving an individual uplink grant for the uplink data (e.g., every TTI, subframe, slot, and/or the like). In some aspects, the semi-persistent scheduling may be configured with a short time interval (e.g., 1 ms and/or the like). Additionally, or alternatively, the action may include configuring uplink grant skipping for the UE 120, which may permit the UE 120 to avoid transmitting padding when an uplink grant is provided and no data is available. In some aspects, the base station 110 may configure semi-persistent scheduling and/or uplink grant skipping to employ low latency communications for uplink communications and/or downlink communications. In some aspects, the base station 110 may provide pre-scheduling, which refers to providing uplink grants absent reception of a UE request for uplink grant.

Additionally, or alternatively, the action may include modifying a configuration of a maximum number of HARQ retransmissions for the UE 120. For example, the base station 110 may reduce a maximum number of uplink HARQ retransmissions (e.g., by instructing the UE 120 using radio resource control (RRC) signaling). In some aspects, the base station 110 may modify the configuration of the maximum number of HARQ retransmissions to employ low latency communications for uplink communications.

Additionally, or alternatively, the action may include modifying a configuration of one or more timers used by the base station 110 or the UE 120. For example, the action may include modifying a configuration of a radio link control (RLC) poll prohibit timer for the base station 110 or the UE 120, modifying a configuration of an RLC reordering timer for the base station 110 or the UE 120, modifying a configuration of an RLC status prohibit timer for the base station 110 or the UE 120, and/or the like. In some aspects, the base station 110 may reduce a duration of an RLC poll prohibit timer used by the UE 120, may reduce a duration of an RLC reordering timer and/or a status prohibit timer of the base station 110, and/or the like to employ low latency communications for uplink communications. Similarly, the base station 110 may reduce a duration of an RLC poll prohibit timer used by the base station 110, may reduce a duration of an RLC reordering timer and/or a status prohibit timer of the UE 120, and/or the like to employ low latency communications for downlink communications.

Additionally, or alternatively, the action may include modifying a configuration of a time interval for scheduling requests by the UE 120. For example, the base station 110 may reduce a time interval for scheduling requests by the UE 120 on an uplink control channel (e.g., a physical uplink control channel (PUCCH) and/or the like) to employ low latency communications for uplink communications. Additionally, or alternatively, the action may include modifying a configuration of a buffer status report (For example, the base station may receive (e.g., using antenna 234, DEMOD 232, MIMO detector 236, receive processor 238, controller/processor 240, and/or the like)) retransmission timer, such as by reducing a duration of a buffer status report (BSR) retransmission timer.

Additionally, or alternatively, the action may include modifying a configuration of a number of repetitions used by the base station 110 and/or the UE 120. For example, the base station 110 may enable a PUSCH enhancement mode with TTI repetitions to employ low latency communications for uplink communications.

Additionally, or alternatively, the action may include modifying a configuration of a discontinuous reception (DRX) timer used by the UE 120. For example, the base station 110 may configure a duration of the DRX timer, such as by reducing a duration of the DRX timer, to employ low latency communications for downlink communications.

In some aspects, the action may include any combination of the above actions and/or other actions that may be used to employ low latency communications for uplink communications and/or downlink communications. By repurposing the delay budget report IE to indicate and/or request low latency communication (e.g., for a default bearer without an associated dedicated bearer), the UE 120 may signal a request and/or an intent to employ low latency communication to the base station 110, and the base station 110 may perform one or more actions to implement low latency communication, thereby reducing latency of communications for the UE 120. Thus, by communicating (e.g., transmitting or receiving) a message that includes a value associated with the delay budget report IE when a dedicated bearer is not active for the UE 120, the UE 120 and/or the base station 110 may cause low latency communication to be configured for the UE 120.

Although some operations are described herein as being performed when a dedicated bearer is not active for the UE 120, one or more of those operations may be performed when a dedicated bearer is active for the UE 120. In this case, the UE 120 may indicate that the value in the message (e.g., in the delay budget report IE) is to be used for employing low latency communication for the default bearer (or another bearer), rather than for notifying the base station 110 of an air interface delay budget adjustment for a dedicated bearer. Such an indication may be included in the message (e.g., via a field in the message, such as a one bit field) or in other signaling (e.g., RRC signaling, uplink control information, and/or the like). Additionally, or alternatively, when multiple bearers are active for the UE 120 (e.g., a default bearer and one or more dedicated bearers), the UE 120 may indicate a specific bearer for which the value in the message is to be used for employing low latency communication.

As indicated above, FIG. 5 is provided as an example. Other examples may differ from what is described with regard to FIG. 5.

Figure 6:
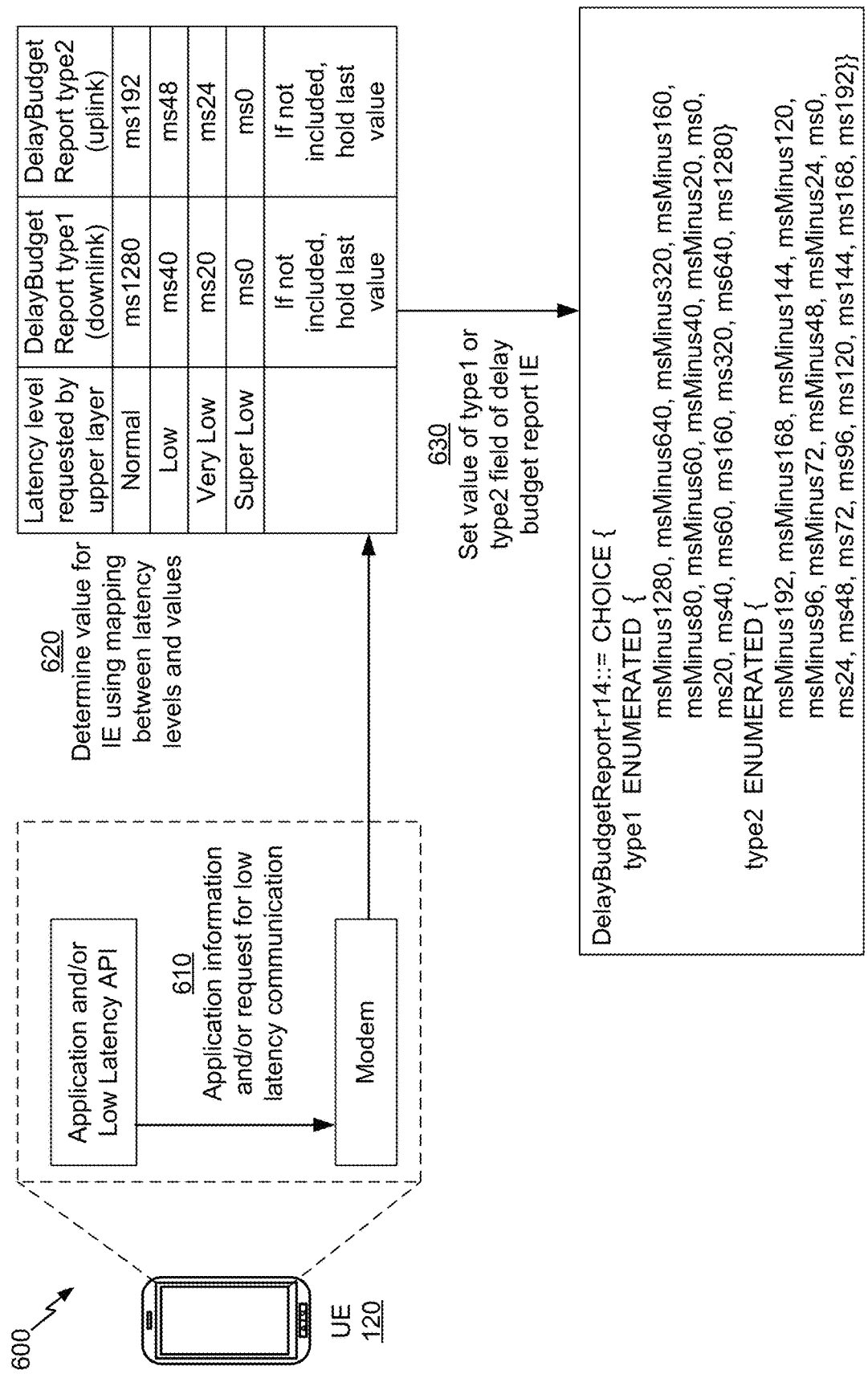

FIG. 6 is a diagram illustrating another example 600 of low latency operation, in accordance with various aspects of the present disclosure. FIG. 6 shows example details of setting a value associated with a delay budget report IE to indicate low latency communication.

As shown by reference number 610, a UE 120 may determine that the UE 120 is to employ low latency communication (e.g., as described above in connection with FIG. 5) based at least in part on receiving application information and/or receiving a request for low latency communication. In some aspects, the UE 120 (e.g., a modem of the UE 120) may receive information from an application executing on the UE 120 (e.g., application information). In some aspects, such information may be received at a modem of the UE 120 from a low latency application programming interface (API), which may receive the information from the application. In some aspects, the information may include a request, from the application, for low latency communication, per direction (uplink/downlink). Additionally, or alternatively, the information may indicate an application type of the application. The application type may include, for example, a voice application (e.g., a VoIP application), a video application, a gaming application, and/or the like. Additionally, or alternatively, the modem may internally detect a need for low latency, such as by performing deep traffic inspection (DPI) and identifying traffic requiring low latency.

As shown by reference number 620, the UE 120 may determine a value for the delay budget report IE using a mapping between latency levels and values associated with the delay budget report IE (e.g., stored in a data structure, such as a table, a memory, a linked list, and/or the like). For example, different values of the delay budget report IE (e.g., in the type1 field and/or in the type2 field) may indicate different latency levels. In this case, the base station 110 may store the same mapping information as the UE 120, and may determine a latency level to be applied to UE communications based at least in part on a mapping of a received value, associated with the delay budget report IE, to the latency level. In some aspects, an upper layer application of the UE 120 may request a latency level (e.g., shown as normal, low, very low, and super low), and the UE 120 (e.g., a modem of the UE 120) may determine a value for the delay budget report IE based at least in part on the requested latency level (e.g., shown as ms1280, ms40, ms20, and ms0 for the type1 field, and ms192, ms48, ms24, and ms0 for the type2 field). Additionally, or alternatively, the UE 120 may determine a latency level based at least in part on a type of the application (e.g., being executed by the UE 120).

Additionally, or alternatively, the upper layer application may request low latency communication for only uplink communications, for only downlink communications, or for both uplink communications and downlink communications, and the UE 120 may determine a value for the delay budget report IE based at least in part on the request. Additionally, or alternatively, the UE 120 may determine a latency level based at least in part on a type of the application. For example, a live video streaming application may use low latency communication for predominantly downlink communication or only downlink communications and not uplink communications, an application for visual drone control (e.g., where a drone operator can see the drone) may use low latency communication for predominantly uplink communication only uplink communication and not downlink communication, a multiplayer online gaming application may use low latency communication for both uplink communications and downlink communications, and/or the like.

In some aspects, UE 120 may use different fields to indicate low latency communication in a particular direction (e.g., uplink or downlink). For example, and as shown, the UE 120 may set a value of the type1 field to indicate that low latency communication is to be used for downlink communications, and may set a value of the type2 field to indicate that low latency communication is to be used for uplink communications. For example, and as shown, the UE 120 may set a value of the type1 field to a first value (e.g., ms1280) to indicate a normal latency level for downlink communications, may later set a value of the type1 field to a second value (e.g., ms40) to indicate a low latency level for downlink communications, may set a value of the type1 field to a third value (e.g., ms20) to indicate a very low latency level for downlink communications, may set a value of the type1 field to a fourth value (e.g., ms0) to indicate a super low latency level for downlink communications, and/or the like. In some aspects, if a message is transmitted without a value in the type1 field, then the base station 110 may continue to use a previously indicated value for the type1 field (e.g., in a previous message) to perform low latency communication with the UE 120. In some aspects, if a message is transmitted with a value in the type1 field, then the base station 110 may override a previously indicated value for the type1 field.

Additionally, or alternatively, and as shown, the UE 120 may set a value of the type2 field to a first value (e.g., ms192) to indicate a normal latency level for uplink communications, may set a value of the type2 field to a second value (e.g., ms48) to indicate a low latency level for uplink communications, may set a value of the type2 field to a third value (e.g., ms24) to indicate a very low latency level for uplink communications, may set a value of the type2 field to a fourth value (e.g., ms0) to indicate a super low latency level for uplink communications, and/or the like. In some aspects, if a message is transmitted without a value in the type2 field, then the base station 110 may continue to use a previously indicated value for the type1 field (e.g., in a previous message) to perform low latency communication with the UE 120. In some aspects, if a message is transmitted with a value in the type2 field, then the base station 110 may override a previously indicated value for the type2 field.

In some aspects, a message may be transmitted with only a type1 value or a type2 value, and not both, for the delay budget report IE. In this case, the UE 120 may transmit separate messages (e.g., two messages) to indicate latency levels for both downlink communications (e.g., using a type1 value in a first message) and uplink communications (e.g., using a type2 value in a second message). Alternatively, the UE 120 may use different values of a same field (e.g., the type1 field or the type2 field) to indicate different latency levels for only uplink communications, different latency levels for only downlink communications, and/or different latency levels for both uplink communications and downlink communications. For example, a first value of the type1 field (e.g., msMinus1280) may indicate a normal latency level for only downlink communications, a second value of the type1 field (e.g., msMinus640) may indicate a normal latency level for only uplink communications, a third value of the type1 field (e.g., msMinus320) may indicate a normal latency level for both downlink communications and uplink communications, a fourth value of the type1 field (e.g., msMinus160) may indicate a low latency level for only downlink communications, and/or the like. In this way, the UE 120 may conserve network resources by transmitting fewer messages (e.g., by indicating both an uplink latency level and a downlink latency level in a single message).

As shown by reference number 630, the UE 120 may set a value associated with the delay budget report IE (e.g., in a type1 field and/or a type2 field) based at least in part on the mapping of values to latency levels, as described above.

When a dedicated bearer is active for the UE 120, the type1 field of the delay budget report IE may be used to indicate, to the base station 110, a preferred amount (e.g., a number of milliseconds) for incrementing or decrementing a continuous DRX (CDRX) cycle length for the UE 120, thereby increasing or decreasing a delay budget adjustment for the dedicated bearer. When a dedicated bearer is active for the UE 120, the type2 field of the delay budget report IE may be used to indicate, to the base station 110, a preferred amount (e.g., a number of milliseconds) for incrementing or decrementing a coverage enhancement configuration for the UE 120 (e.g., which may be used by the base station 110 to increase or decrease a number of repetitions used for communications with the UE 120), thereby increasing or decreasing a delay budget adjustment for the dedicated bearer. By repurposing the type1 and/or type2 field of the delay budget report IE to indicate and/or request low latency communication when a dedicated bearer is not active for the UE 120 (e.g., via a default bearer that does not have an active associated dedicated bearer), the same IE and/or the same field of the IE may be used for different indications depending on whether a dedicated bearer is active for the UE 120 when a message that includes the IE and/or the field is transmitted or received, thereby reducing overhead associated with introducing an additional IE and/or field.

As indicated above, FIG. 6 is provided as an example. Other examples may differ from what is described with regard to FIG. 6.

Figure 7:
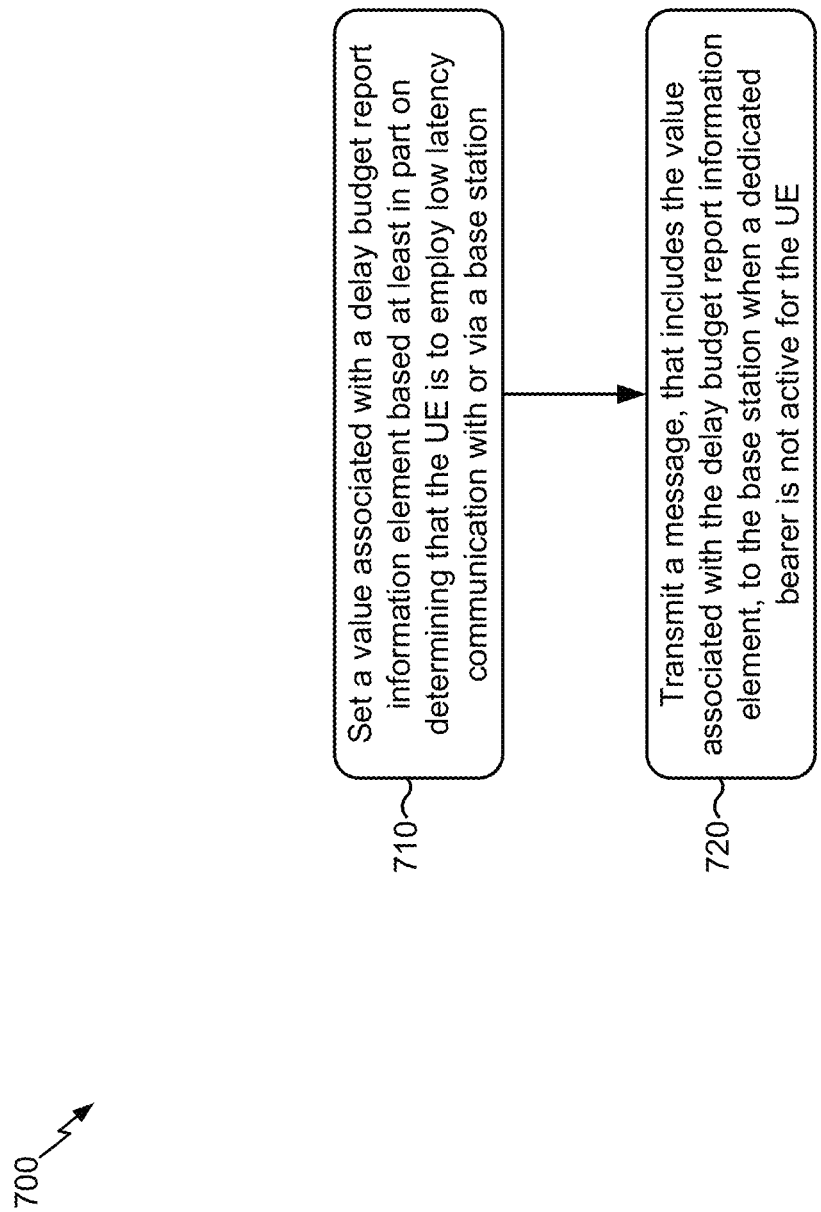
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs low latency operations.

As shown in FIG. 7, in some aspects, process 700 may include setting a value associated with a delay budget report information element based at least in part on determining that the UE is to employ low latency communication with or via a base station (block 710). For example, the UE may set (e.g., using controller/processor 280 and/or the like) a value associated with a delay budget report information element, as described above in connection with FIGS. 5 and 6. In some aspects, the UE may set the value based at least in part on determining that the UE is to employ low latency communication with or via a base station.

As further shown in FIG. 7, in some aspects, process 700 may include transmitting a message, that includes the value associated with the delay budget report information element, to the base station when a dedicated bearer is not active for the UE (block 720). For example, the UE may transmit (e.g., using controller/processor 280, transmit processor 264, TX MIMO processor 266, MOD 254, antenna 252, and/or the like) a message, that includes the value associated with the delay budget report information element, to the base station when a dedicated bearer is not active for the UE, as described above in connection with FIGS. 5 and 6.

Process 700 may include additional aspects, such as any single aspect and/or any combination of aspects described below and/or in connection with one or more other processes described elsewhere herein.

In some aspects, the message notifies the base station that the UE is to employ low latency communication with or via the base station. In some aspects, the value associated with the delay budget report information element notifies the base station of an air interface delay budget adjustment when a dedicated bearer is active for the UE. In some aspects, the value associated with the delay budget report information element notifies the base station of an air interface delay budget adjustment when a dedicated bearer is not active for the UE. In some aspects, the value is included in a type1 field or a type2 field of the delay budget report information element.

In some aspects, the value indicates that the UE is to employ low latency communication for both downlink communications and uplink communications with or via the base station. In some aspects, the value indicates that the UE is to employ low latency communication for only downlink communications and not uplink communications with or via the base station. In some aspects, the value indicates that the UE is to employ low latency communication for only uplink communications and not downlink communications with or via the base station.

In some aspects, the value is set based at least in part on a type of application associated with the low latency communication. In some aspects, the value indicates that a previously indicated value is to be overridden. In some aspects, the value is set based at least in part on information received from an application executing on the UE. In some aspects, different values associated with the delay budget report information element map to different latency levels of the low latency communication. In some aspects, the dedicated bearer is associated with Internet traffic.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
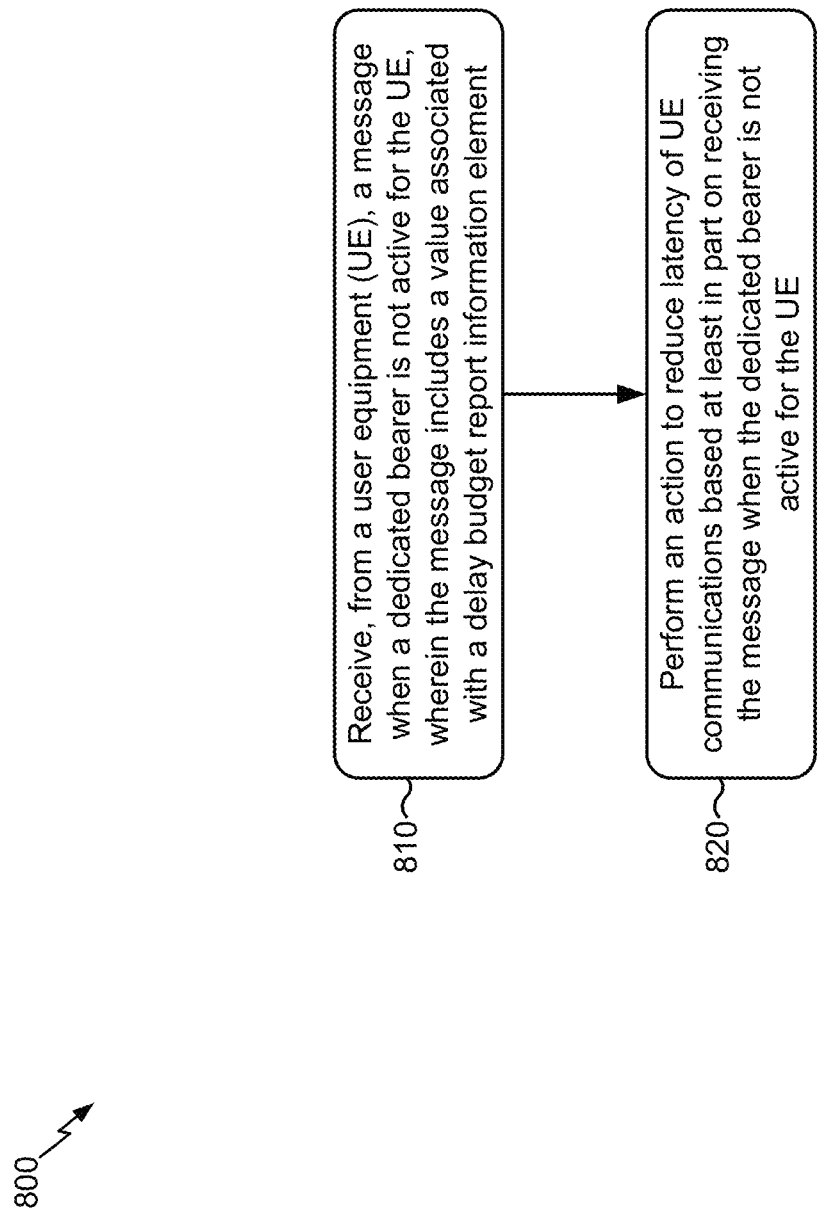
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where a base station (e.g., base station 110 and/or the like) performs low latency operations.

As shown in FIG. 8, in some aspects, process 800 may include receiving, from a user equipment (UE), a message when a dedicated bearer is not active for the UE, wherein the message includes a value associated with a delay budget report information element (block 810). For example, the base station may receive (e.g., using antenna 234, DEMOD 232, MIMO detector 236, receive processor 238, controller/processor 240, and/or the like), from a UE, a message when a dedicated bearer is not active for the UE, wherein the message includes a value associated with a delay budget report information element, as described above in connection with FIGS. 5 and 6.

As further shown in FIG. 8, in some aspects, process 800 may include performing an action to reduce latency of UE communications based at least in part on receiving the message when the dedicated bearer is not active for the UE (block 820). For example, the base station may perform (e.g., using controller/processor 240 and/or the like) an action to reduce latency of UE communications based at least in part on receiving the message when the dedicated bearer is not active for the UE, as described above in connection with FIGS. 5 and 6.

Process 800 may include additional aspects, such as any single aspect and/or any combination of aspects described below and/or in connection with one or more other processes described elsewhere herein.

In some aspects, the value is included in a type1 field or a type2 field of the delay budget information element. In some aspects, the value indicates that the UE is to employ low latency communication with or via the base station for both downlink communications and uplink communications. In some aspects, the value indicates that the UE is to employ low latency communication with or via the base station for only downlink communications and not uplink communications. In some aspects, the value indicates that the UE is to employ low latency communication with or via the base station for only uplink communications and not downlink communications. In some aspects, the value indicates that a previously indicated value is to be overridden. In some aspects, different values associated with the delay budget report information element map to different communication latency levels.

In some aspects, the base station may indicate the action to the UE. In some aspects, performing the action may include modifying one or more parameters of a default bearer of the UE. In some aspects, performing the action may include at least one of: modifying a set point for early hybrid automatic repeat request (HARQ) termination for the UE, modifying a configuration of a transmission time interval used to communicate with the UE, configuring a low latency operating mode for the UE, configuring semi-persistent scheduling for the UE, configuring uplink grant skipping for the UE, modifying a configuration of a maximum number of HARQ retransmissions for the UE, modifying a configuration of one or more timers used by the base station or the UE, modifying a configuration of a radio link control (RLC) poll prohibit timer for the base station or the UE, modifying a configuration of an RLC reordering timer for the base station or the UE, modifying a configuration of an RLC status prohibit timer for the base station or the UE, modifying a configuration of a time interval for scheduling requests by the UE, modifying a configuration of a number of repetitions used by the UE or the base station, modifying a configuration of a discontinuous reception (DRX) timer used by the UE, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
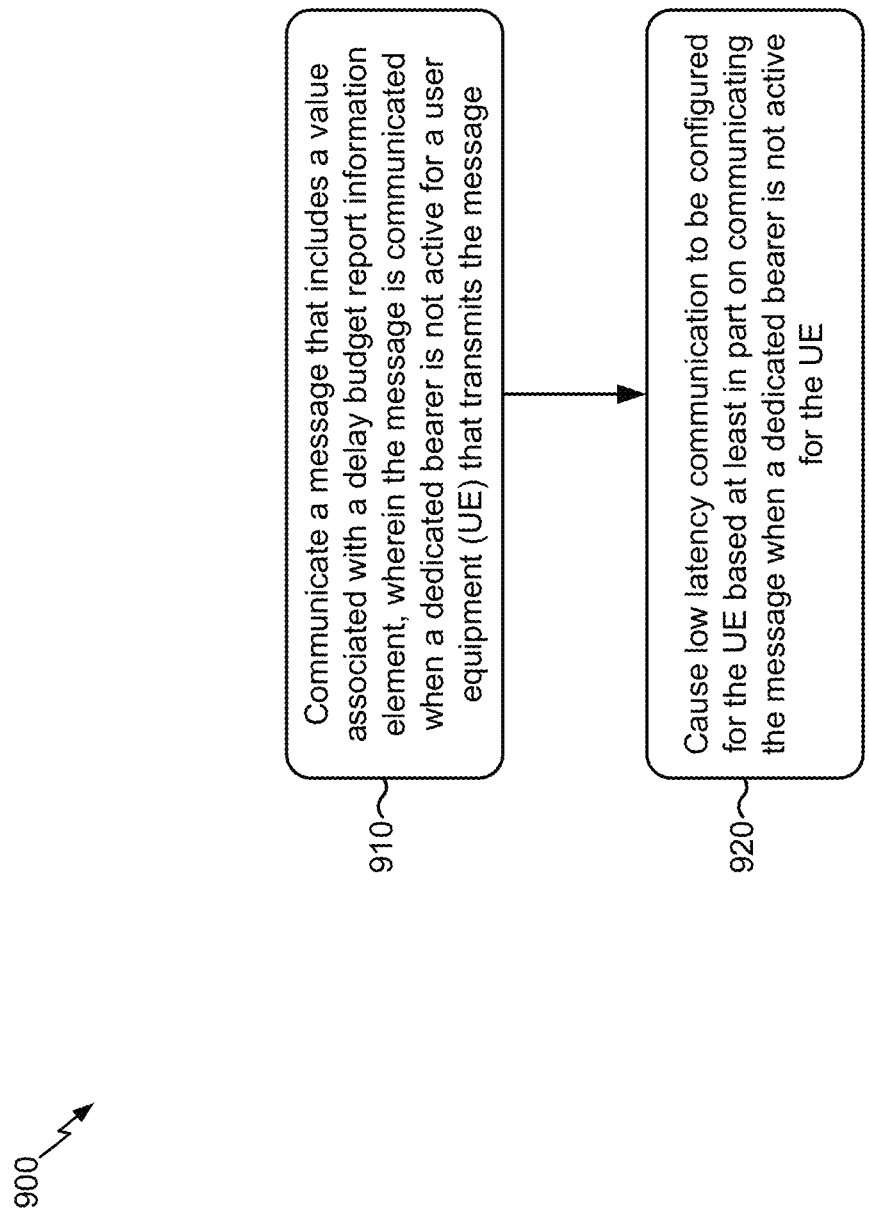
FIG. 9 is a diagram illustrating an example process performed, for example, by a wireless communication device, in accordance with various aspects of the present disclosure.

FIG. 9 is a diagram illustrating an example process 900 performed, for example, by a wireless communication device, in accordance with various aspects of the present disclosure. Example process 900 is an example where a wireless communication device (e.g., base station 110, UE 120, and/or the like) performs low latency operations.

As shown in FIG. 9, in some aspects, process 900 may include communicating a message that includes a value associated with a delay budget report information element, wherein the message is communicated when a dedicated bearer is not active for a user equipment (UE) that transmits the message (block 910). For example, the wireless communication device may communicate (e.g., using transmit processor 220, TX MIMO processor 230, MOD/DEMOD 232, antenna 234, MIMO detector 236, receive processor 238, controller/processor 240, antenna 252, MOD/DEMOD 254, MIMO detector 256, receive processor 258, transmit processor 264, TX MIMO processor 266, controller/processor 280, and/or the like) a message that includes a value associated with a delay budget report information element, wherein the message is communicated when a dedicated bearer is not active for a UE that transmits the message, as described above in connection with FIGS. 5 and 6.

As further shown in FIG. 9, in some aspects, process 900 may include causing low latency communication to be configured for the UE based at least in part on communicating the message when a dedicated bearer is not active for the UE (block 920). For example, the wireless communication device may cause (e.g., using controller/processor 240, controller/processor 280, and/or the like) low latency communication to be configured for the UE based at least in part on communicating the message when a dedicated bearer is not active for the UE.

Process 900 may include additional aspects, such as any single aspect and/or any combination of aspects described below and/or in connection with one or more other processes described elsewhere herein.

In some aspects, the wireless communication device is the UE, and communicating the message includes transmitting the message. In some aspects, the wireless communication device is a base station, and communicating the message includes receiving the message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
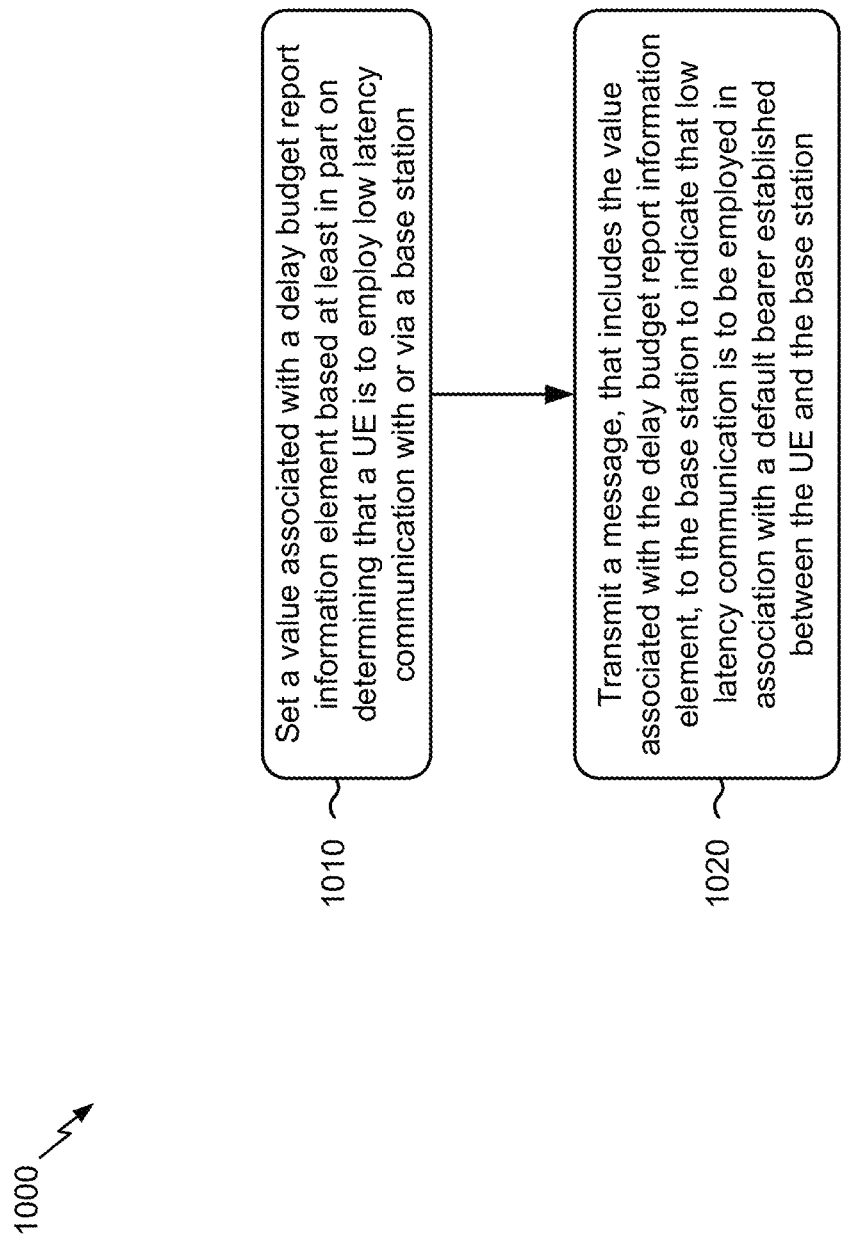
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs low latency operations.

As shown in FIG. 10, in some aspects, process 1000 may include setting a value associated with a delay budget report information element based at least in part on determining that the UE is to employ low latency communication with or via a base station (block 1010). For example, the UE may set (e.g., using controller/processor 280 and/or the like) a value associated with a delay budget report information element, as described above. In some aspects, the UE may set the value based at least in part on determining that the UE is to employ low latency communication with or via a base station.

As further shown in FIG. 10, in some aspects, process 1000 may include transmitting a message, that includes the value associated with the delay budget report information element, to the base station to indicate that low latency communication is to be employed in association with a default bearer established between the UE and the base station (block 1020). For example, the UE may transmit (e.g., using controller/processor 280, transmit processor 264, TX MIMO processor 266, MOD 254, antenna 252, and/or the like) a message, that includes the value associated with the delay budget report information element, to the base station to indicate that low latency communication is to be employed in association with a default bearer established between the UE and the base station, as described above.

Process 1000 may include additional aspects, such as any single aspect and/or any combination of aspects described below and/or in connection with one or more other processes described elsewhere herein.

In some aspects, the message is transmitted when a dedicated bearer is not active for the UE. In some aspects, the message notifies the base station that the UE is to employ low latency communication with or via the base station. In some aspects, the value associated with the delay budget report information element notifies the base station of an air interface delay budget adjustment when a dedicated bearer is active for the UE. In some aspects, the value is included in a type1 field or a type2 field of the delay budget report information element.

In some aspects, the value indicates that low latency communication is to be employed for both downlink communications and uplink communications, only downlink communications and not uplink communications, or only uplink communications and not downlink communications. In some aspects, the value is set based at least in part on at least one of: a type of application associated with the low latency communication, information received from an application executing on the UE, information received by a modem of the UE, or a combination thereof.

In some aspects, the value indicates that a previously indicated value is to be overridden. In some aspects, different values associated with the delay budget report information element map to different latency levels of the low latency communication.

In some aspects, the message is transmitted when a dedicated bearer is active for the UE, and wherein the UE is configured to indicate that the value is to be used for employing low latency communication for the default bearer.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
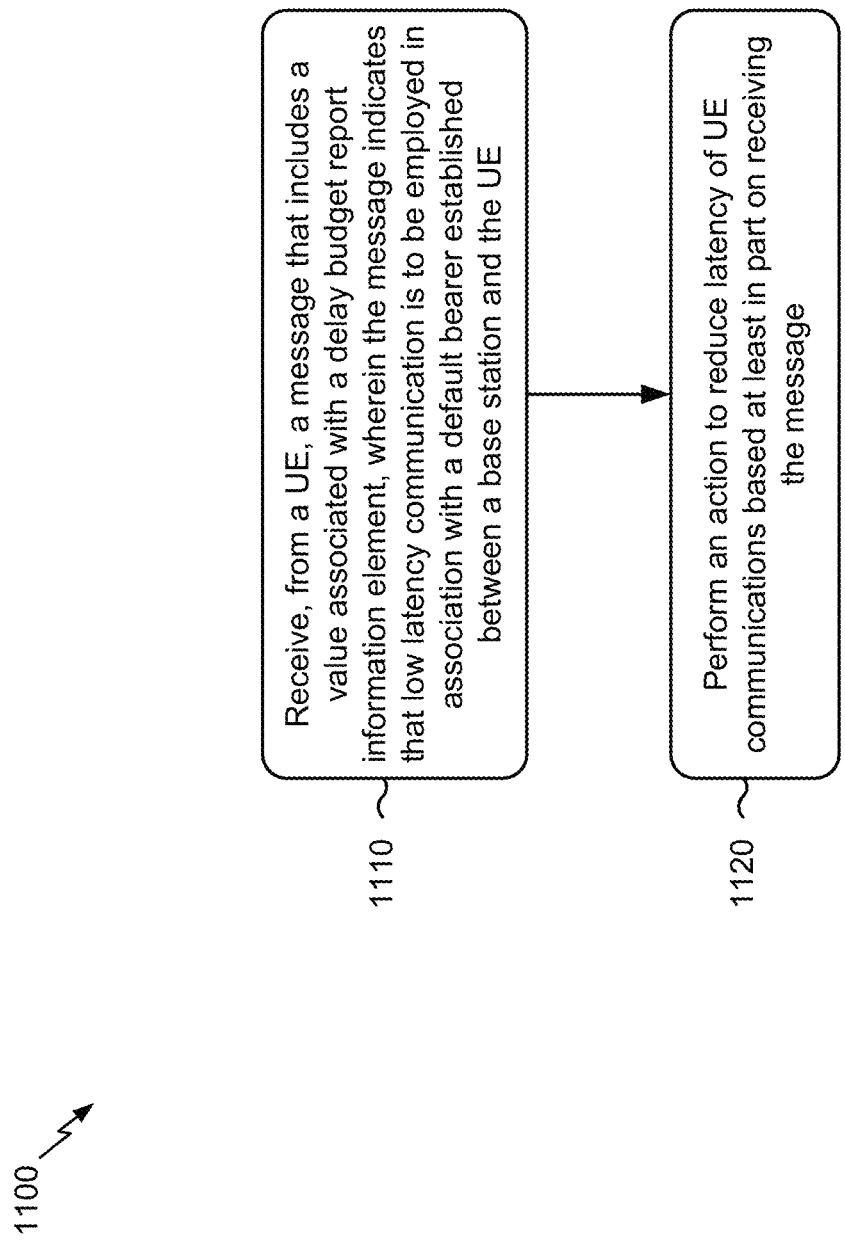
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., base station 110 and/or the like) performs low latency operations.

As shown in FIG. 11, in some aspects, process 1100 may include receiving, from a UE, a message that includes a value associated with a delay budget report information element, wherein the message indicates that low latency communication is to be employed in association with a default bearer established between a base station and the UE (block 1110). For example, the base station may receive (e.g., using antenna 234, DEMOD 232, MIMO detector 236, receive processor 238, controller/processor 240, and/or the like), from a UE, a message that includes a value associated with a delay budget report information element, as described above. In some aspects, the message indicates that low latency communication is to be employed in association with a default bearer established between the base station and the UE.

As further shown in FIG. 11, in some aspects, process 1100 may include performing an action to reduce latency of UE communications based at least in part on receiving the message (block 1120). For example, the base station may perform (e.g., using controller/processor 240 and/or the like) an action to reduce latency of UE communications based at least in part on receiving the message, as described above.

Process 1100 may include additional aspects, such as any single aspect and/or any combination of aspects described below and/or in connection with one or more other processes described elsewhere herein.

In some aspects, the message is received when a dedicated bearer is not active for the UE. In some aspects, the value is included in a type1 field or a type2 field of the delay budget report information element. In some aspects, the value indicates low latency communication is to be employed for: both downlink communications and uplink communications, only downlink communications and not uplink communications, or only uplink communications and not downlink communications.

In some aspects, the value indicates that a previously indicated value is to be overridden. In some aspects, different values associated with the delay budget report information element map to different communication latency levels. In some aspects, process 1100 may include indicating the action to the UE.

In some aspects, performing the action comprises modifying one or more parameters of the default bearer. In some aspects, performing the action comprises at least one of: modifying a set point for early hybrid automatic repeat request (HARQ) termination for the UE, modifying a configuration of a transmission time interval used to communicate with the UE, configuring a low latency operating mode for the UE, configuring semi-persistent scheduling for the UE, configuring uplink grant skipping for the UE, modifying a configuration of a maximum number of HARQ retransmissions for the UE, modifying a configuration of one or more timers used by the base station or the UE, modifying a configuration of a radio link control (RLC) poll prohibit timer for the base station or the UE, modifying a configuration of an RLC reordering timer for the base station or the UE, modifying a configuration of an RLC status prohibit timer for the base station or the UE, modifying a configuration of a time interval for scheduling requests by the UE, modifying a configuration of a number of repetitions used by the UE or the base station, modifying a configuration of a discontinuous reception (DRX) timer used by the UE, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   setting a value in a type1 field or a type2 field of a delay budget report information element based at least in part on determining that the UE is to employ low latency communication with or via a base station,
   the type1 field being associated with a downlink communication, and
   the type2 field being associated with an uplink communication; and
   transmitting a message, that includes the value in the type1 field or the type2 field of the delay budget report information element, to the base station to indicate that low latency communication is to be employed in association with a default bearer established between the UE and the base station.

2. The method of claim 1, wherein the message is transmitted when a dedicated bearer is not active for the UE.

3. The method of claim 1, wherein the message notifies the base station that the UE is to employ low latency communication with or via the base station.

4. The method of claim 1, wherein the value in the type1 field or the type2 field of the delay budget report information element notifies the base station of an air interface delay budget adjustment when a dedicated bearer is active for the UE.

5. The method of claim 1, wherein the value in the type1 field or the type2 field of the delay budget report information element indicates that low latency communications are to be employed for:
   both downlink communications and uplink communications,
   only downlink communications and not uplink communications, or
   only uplink communications and not downlink communications.

6. The method of claim 1, wherein the value in the type1 field or the type2 field of the delay budget report information element is set based at least in part on at least one of:
   a type of application associated with low latency communication,
   information received from an application executing on the UE,
   information received by a modem of the UE, or
   a combination thereof.

7. The method of claim 1, wherein the value in the type1 field or the type2 field of the delay budget report information element indicates that a previously indicated value in the type1 field or the type2 field of the delay budget report information element is to be overridden.

8. The method of claim 1, wherein different values in the type1 field or the type2 field of the delay budget report information element map to different latency levels of low latency communication.

9. The method of claim 1, wherein the message is transmitted when a dedicated bearer is active for the UE, and wherein the UE is configured to indicate that the value in the type1 field or the type2 field of the delay budget report information element is to be used for employing low latency communication for the default bearer.

10. A method of wireless communication performed by a base station, comprising:
    receiving, from a user equipment (UE), a message that includes a value in a type1 field or a type2 field of a delay budget report information element,
        wherein the message indicates that low latency communication is to be employed in association with a default bearer established between the base station and the UE,
        wherein the type1 field is associated with a downlink communication, and
        wherein the type2 field is associated with an uplink communication; and
    performing an action to reduce latency of UE communications based at least in part on receiving the message.

11. The method of claim 10, wherein the message is received when a dedicated bearer is not active for the UE.

12. The method of claim 10, wherein the value in the type1 field or the type2 field of the delay budget report information element indicates that low latency communication is to be employed for:
    both downlink communications and uplink communications,
    only downlink communications and not uplink communications, or
    only uplink communications and not downlink communications.

13. The method of claim 10, wherein the value in the type1 field or the type2 field of the delay budget report information element indicates that a previously indicated value in the type1 field or the type2 field of the delay budget report information element is to be overridden.

14. The method of claim 10, wherein different values in the type1 field or the type2 field of the delay budget report information element map to different communication latency levels.

15. The method of claim 10, further comprising indicating the action to the UE.

16. The method of claim 10, wherein performing the action comprises modifying one or more parameters of the default bearer.

17. The method of claim 10, wherein performing the action comprises at least one of:
    modifying a set point for early hybrid automatic repeat request (HARQ) termination for the UE,
    modifying a configuration of a transmission time interval used to communicate with the UE,
    configuring a low latency operating mode for the UE,
    configuring semi-persistent scheduling for the UE,
    configuring uplink grant skipping for the UE,
    modifying a configuration of a maximum number of HARQ retransmissions for the UE,
    modifying a configuration of one or more timers used by the base station or the UE, modifying a configuration of a radio link control (RLC) poll prohibit timer for the base station or the UE, modifying a configuration of an RLC reordering timer for the base station or the UE, modifying a configuration of an RLC status prohibit timer for the base station or the UE, modifying a configuration of a time interval for scheduling requests by the UE, modifying a configuration of a number of repetitions used by the UE or the base station, modifying a configuration of a discontinuous reception (DRX) timer used by the UE, or a combination thereof.

18. A user equipment (UE) for wireless communication, comprising:

memory; and one or more processors coupled to the memory, the one or more processors configured to:
set a value in a type1 field or a type2 field of a delay budget report information element based at least in part on determining that the UE is to employ low latency communication with or via a base station,
the type1 field being associated with a downlink communication, and
the type2 field being associated with an uplink communication; and
transmit a message, that includes the value in the type1 field or the type2 field of the delay budget report information element, to the base station to indicate that low latency communication is to be employed in association with a default bearer established between the UE and the base station.

19. The UE of claim 18, wherein the message is transmitted when a dedicated bearer is not established between the UE and the base station.

20. The UE of claim 18, wherein the value in the type1 field or the type2 field of the delay budget report information element is set based at least in part on at least one of:

a type of application associated with low latency communication, information received from an application executing on the UE, information received by a modem of the UE, or a combination thereof.

21. The UE of claim 18, wherein different values in the type1 field or the type2 field of the delay budget report information element map to different latency levels of low latency communication.

22. The UE of claim 18, wherein the message is transmitted when a dedicated bearer is active for the UE, and wherein the one or more processors are configured to indicate that the value in the type1 field or the type2 field of the delay budget report information element is to be used for employing low latency communication for the default bearer.

23. The UE of claim 18, wherein the value in the type1 field or the type2 field of the delay budget report information element indicates that a previously indicated value in the type1 field or the type2 field of the delay budget report information element is to be overridden.

24. A base station for wireless communication, comprising:

memory; and one or more processors coupled to the memory, the one or more processors configured to:
receive, from a user equipment (UE), a message that includes a value in a type1 field or a type2 field of a delay budget report information element,
wherein the message indicates that low latency communication is to be employed in association with a default bearer established between the base station and the UE,
wherein the type1 field is associated with a downlink communication, and
wherein the type2 field is associated with an uplink communication; and
perform an action to reduce latency of UE communications based at least in part on receiving the message.

25. The base station of claim 24, wherein the message is received when a dedicated bearer is established between the base station and the UE.

26. The base station of claim 24, wherein the value in the type1 field or the type2 field of the delay budget report information element indicates that low latency is to be employed for:

both downlink communications and uplink communications, only downlink communications and not uplink communications, or only uplink communications and not downlink communications.

27. The base station of claim 24, wherein different values in the type1 field or the type2 field of the delay budget report information element map to different latency levels.

28. The base station of claim 24, wherein the action is indicated to the UE.

29. The base station of claim 24, wherein the one or more processors, when performing the action, are configured to:

modify one or more parameters of the default bearer, modify a set point for early hybrid automatic repeat request (HARQ) termination for the UE, modify a configuration of a transmission time interval used to communicate with the UE, configure a low latency operating mode for the UE, configure semi-persistent scheduling for the UE, configure uplink grant skipping for the UE, modify a configuration of a maximum number of HARQ retransmissions for the UE, modify a configuration of one or more timers used by the base station or the UE, modify a configuration of a radio link control (RLC) poll prohibit timer for the base station or the UE, modify a configuration of an RLC reordering timer for the base station or the UE, modify a configuration of an RLC status prohibit timer for the base station or the UE, modify a configuration of a time interval for scheduling requests by the UE, modify a configuration of a number of repetitions used by the UE or the base station, modify a configuration of a discontinuous reception (DRX) timer used by the UE, or a combination thereof.

30. The base station of claim 24, wherein the value in the type1 field or the type2 field of the delay budget report information element indicates that a previously indicated value in the type1 field or the type2 field of the delay budget report information element is to be overridden.

* * * * *